(12) United States Patent
Tan et al.

(10) Patent No.: US 8,032,006 B2
(45) Date of Patent: Oct. 4, 2011

(54) DIGITAL PROCESSING DISRUPTION SYSTEMS

(75) Inventors: Baolin Tan, Stevenage (GB); Mazen Abdul-Hamed Abdin, Stevenage (GB); Maotai Hu, Stevenage (GB)

(73) Assignee: DCS Copy Protection Limited, Steeton (GB)

( * ) Notice: Subject to any disclaimer, the term of this patent is extended or adjusted under 35 U.S.C. 154(b) by 1521 days.

(21) Appl. No.: 10/559,715

(22) PCT Filed: Jun. 7, 2004

(86) PCT No.: PCT/GB2004/002415
§ 371 (c)(1),
(2), (4) Date: Jun. 5, 2006

(87) PCT Pub. No.: WO2004/110060
PCT Pub. Date: Dec. 16, 2004

(65) Prior Publication Data
US 2007/0030968 A1 Feb. 8, 2007

(30) Foreign Application Priority Data
Jun. 5, 2003 (GB) .................................. 0312985.5

(51) Int. Cl.
*H04N 9/80* (2006.01)
(52) U.S. Cl. ........ 386/248; 386/252; 386/254; 386/255; 386/257; 386/258; 386/259; 386/260
(58) Field of Classification Search ................ 386/1, 12, 386/46, 48, 61, 84, 94, 95, 248, 252, 254, 386/255, 257, 258, 259, 260; 380/204, 221, 380/224
See application file for complete search history.

(56) References Cited

U.S. PATENT DOCUMENTS

| 4,086,634 A | 4/1978 | Cook |
| 4,100,575 A | 7/1978 | Morio et al. |

(Continued)

FOREIGN PATENT DOCUMENTS

DE 3806411 9/1989

(Continued)

OTHER PUBLICATIONS

Examination Report mailed on Jun. 28, 2007 for European Patent Application 04736226.4, entitled "Digital Processing Disruption System", filed on Jun. 7, 2004 in the name of Dwight Cavendish Systems Limited.

(Continued)

*Primary Examiner* — Thai Tran
*Assistant Examiner* — Daquan Zhao
(74) *Attorney, Agent, or Firm* — Dorsey & Whitney LLP (57) ABSTRACT

A method and apparatus are described for modifying an analogue video signal to impair its conversion to a digital signal by an analogue to digital converter. The resulting modified signal may prevent the operation of the analogue to digital converter altogether, or even if a digital signal can be output and recorded, may result in a signal which is difficult to view due to a reduction in quality on playback. The modifications made to the signal include altering the amplitude of the horizontal synchronization pulses in the original signal, and/or modifying the level of the back porch, or the region of the signal adjacent the back porch. Additionally, methods are contemplated for the use of specific response models for target analogue to digital converters, and display devices.

32 Claims, 6 Drawing Sheets

U.S. PATENT DOCUMENTS

| | | | |
|---|---|---|---|
| 4,163,253 A | 7/1979 | Morio et al. | |
| 4,571,642 A | 2/1986 | Hofstein | |
| 4,577,216 A | 3/1986 | Ryan | |
| 4,626,890 A | 12/1986 | Ryan | |
| 4,631,603 A | 12/1986 | Ryan | |
| 4,644,422 A | 2/1987 | Bedini | |
| 4,695,901 A | 9/1987 | Ryan | |
| 4,802,212 A | 1/1989 | Freeman et al. | |
| 4,819,098 A | 4/1989 | Ryan | |
| 4,888,649 A | 12/1989 | Kagota | |
| 5,073,925 A | 12/1991 | Nagata et al. | |
| 5,155,767 A | 10/1992 | Noller et al. | |
| 5,161,210 A | 11/1992 | Druyvesteyn et al. | |
| 5,194,965 A | 3/1993 | Quan et al. | |
| 5,251,041 A | 10/1993 | Young et al. | |
| 5,315,448 A * | 5/1994 | Ryan | 360/60 |
| 5,394,274 A | 2/1995 | Kahn et al. | |
| 5,513,260 A | 4/1996 | Ryan | |
| 5,523,853 A | 6/1996 | Yamashita et al. | |
| 5,583,936 A | 12/1996 | Wonfor et al. | |
| 5,585,929 A | 12/1996 | Young et al. | |
| 5,608,799 A | 3/1997 | Ryan et al. | |
| 5,719,937 A | 2/1998 | Warren et al. | |
| 5,737,417 A | 4/1998 | Buynak et al. | |
| 5,784,523 A | 7/1998 | Quan et al. | |
| 5,822,360 A | 10/1998 | Lee et al. | |
| 5,907,656 A | 5/1999 | Oguro et al. | |
| 6,018,608 A | 1/2000 | Sakashita et al. | |
| 6,035,094 A | 3/2000 | Kori | |
| 6,041,158 A | 3/2000 | Sato | |
| 6,064,442 A | 5/2000 | Aihara | |
| 6,091,822 A | 7/2000 | Mellows et al. | |
| 6,188,832 B1 * | 2/2001 | Ryan | 386/94 |
| 6,222,978 B1 | 4/2001 | Hirai | |
| 6,268,889 B1 | 7/2001 | Koori | |
| 6,271,889 B1 | 8/2001 | Bohm et al. | |
| 6,327,422 B1 | 12/2001 | Quan et al. | |
| 6,404,974 B1 | 6/2002 | Franklin | |
| 6,459,795 B1 | 10/2002 | Quan | |
| 6,516,132 B1 | 2/2003 | Wrobleski et al. | |
| 6,600,873 B1 | 7/2003 | Brill et al. | |
| 6,882,490 B1 | 4/2005 | Tan et al. | |
| 6,904,153 B1 | 6/2005 | Wijnen et al. | |
| 6,956,621 B2 | 10/2005 | Movshovish et al. | |
| 7,236,683 B2 * | 6/2007 | Quan | 386/1 |
| 7,471,479 B2 | 12/2008 | Tan et al. | |
| 2002/0009000 A1 | 1/2002 | Goldberg et al. | |
| 2003/0108201 A1 | 6/2003 | Rumreich | |
| 2004/0039913 A1 | 2/2004 | Kruse | |
| 2004/0252615 A1 | 12/2004 | Keech | |
| 2005/0111661 A1 | 5/2005 | Wijnen et al. | |
| 2005/0141876 A1 | 6/2005 | Quan | |
| 2006/0093326 A1 | 5/2006 | Tan et al. | |
| 2008/0089202 A1 | 4/2008 | Robinson et al. | |
| 2009/0202215 A1 | 8/2009 | Tan | |
| 2009/0297125 A1 | 12/2009 | Wijnen et al. | |

FOREIGN PATENT DOCUMENTS

| | | |
|---|---|---|
| EP | 0372601 | 6/1990 |
| EP | 0392612 | 10/1990 |
| EP | 0763936 | 3/1997 |
| EP | 0831648 | 3/1998 |
| EP | 1169707 | 12/2003 |
| FR | 2740897 | 5/1997 |
| GB | 1571386 | 7/1980 |
| GB | 2164481 | 3/1986 |
| GB | 2199689 | 7/1988 |
| GB | 2348736 | 10/2000 |
| WO | WO 96/00963 | 1/1986 |
| WO | WO 96/31878 | 10/1996 |
| WO | WO 88/02588 | 4/1998 |
| WO | WO 99/00977 | 1/1999 |
| WO | WO 99/57723 | 11/1999 |
| WO | WO01/74068 A1 | 10/2001 |
| WO | WO 01/76240 | 10/2001 |
| WO | WO 01/88915 | 11/2001 |
| WO | WO 02/15557 | 2/2002 |
| WO | WO03/065716 A2 | 2/2003 |
| WO | WO 2004/066295 | 8/2004 |

OTHER PUBLICATIONS

Office Action mailed on Mar. 24, 2009 for Australian Patent Application 2004246229, entitled "Digital Processing Disruption System", filed on Jun. 7, 2004 in the name of Dwight Cavendish Systems Limited.

Foede, W., "Video Copy Processor," Elektor Electronics, Elektor Publishers Ltd., Canterbury GB, Nov. 1, 1997, vol. 23, No. 260, pp. 28-33.

European Search Report dated Jun. 2, 2008, EP 08002037, 2 pages.

International Search Report and Written Opinion dated Mar. 2, 2006, PCT/GB2005/003948, 10 pages.

United Kingdom Search Report dated Nov. 30, 2004, GB 04227435 (PCT/GB2004/000269), 2 pages.

United Kingdom Search Report dated Jun. 8, 2004, PCT/GB2004/000269, 3 pages.

United Kingdom Search Report dated Aug. 9, 2002, GB 0202384.4, 6 pages.

United Kingdom Search Report dated Apr. 27, 2004, GB0407606.3, 1 page.

International Search Report dated Oct. 20, 2003, PCT/GB2003/02782, 3 pages.

International Search Report and Written Opinion dated Mar. 20, 2008, PCT/GB2006/002358, 14 pages.

European Search Report dated Nov. 9, 2009, EP 04736226.4, 2 pages.

Canadian Office Action dated Dec. 18, 2009, Canada Patent Application No. 2,495,200, 4 pages.

International Search Report dated Nov. 10, 2003, PCT/GB2003/0002782, 3 pages.

United Kingdom Search Report dated Dec. 2, 2002, GB 0215040.7, 1 page.

European Search Report dated Sep. 18, 2009, EP 06755644.9, 3 pages.

* cited by examiner

DIGITAL PROCESSING DISRUPTION SYSTEMS

The present invention relates to methods of disrupting the processing of video signals, so as to inhibit copying, and to systems for counteracting such disruption methods.

It is well known that films and other video material distributed on video tape, or by means such as direct broadcast or cable, are often subject to copying onto tape, much of which is in breach of the rights owners' rights.

As a result technologies have been developed which modify the video signal recorded on the original video tape, or in the form in which it is otherwise distributed, in a way which interferes with the normal operation of a standard video recorder so that copies made of such modified video signals cannot be played, or the viewability or playback quality of such recorded video signals is impaired. One well known such technology is licensed by Macrovision Corporation.

Recently, digital technology has become available for distribution of video material. Concerns have been expressed that such material is of much higher quality and thus that much higher quality copies may be made. In addition, it is now possible to make digital copies of video material that is intended for viewing on display devices such as television receivers or similar apparatus, and, once made, these can be further reproduced with little degradation in quality. It has been found that the existing copy protection processes, such as that most commonly licensed by Macrovision, are not effective, at least in some circumstances, to prevent digital copying of analogue video signals.

We have therefore appreciated that there is a need for further copy protection technology to impair copying of analogue video material to digital form.

The invention is defined by the independent claims to which reference should now be made. Advantageous features are set forth in the appendant claims.

Preferred embodiments of the invention will now be described in more detail, by way of example, and with reference to the drawings in which.

The preferred embodiment of the invention provides a method of modifying a video signal in a manner which impairs its conversion by an analogue to digital video converter. The term analogue to digital video converter is used to refer to any system which converts an analogue video signal into a digital signal, and may therefore also include video capture systems using such converters. Examples of such systems are video capture cards, and systems such as the TIVO system, and DVD recorders.

It is not material whether the resulting digital signal is recorded or not, although clearly following most conversion processes the digital signal is recorded at least temporarily. Otherwise the signal may simply be processed in digital processing equipment.

As is well known, a conventional analogue video signal includes several video components. One of these components is a pulse which is designed to identify the point at which the end of one line of active video occurs, and the next starts (at which point the television set executes a horizontal retrace). This pulse is known as a horizontal synchronisation pulse. Immediately prior to the horizontal synchronisation pulse, there is a region known as the front porch, and immediately after the horizontal synchronisation pulse there is a region known as the back porch. The latter extends from the horizontal synchronisation pulse to the beginning of the active video—the point at which the picture information starts for the next line.

Figure 1:
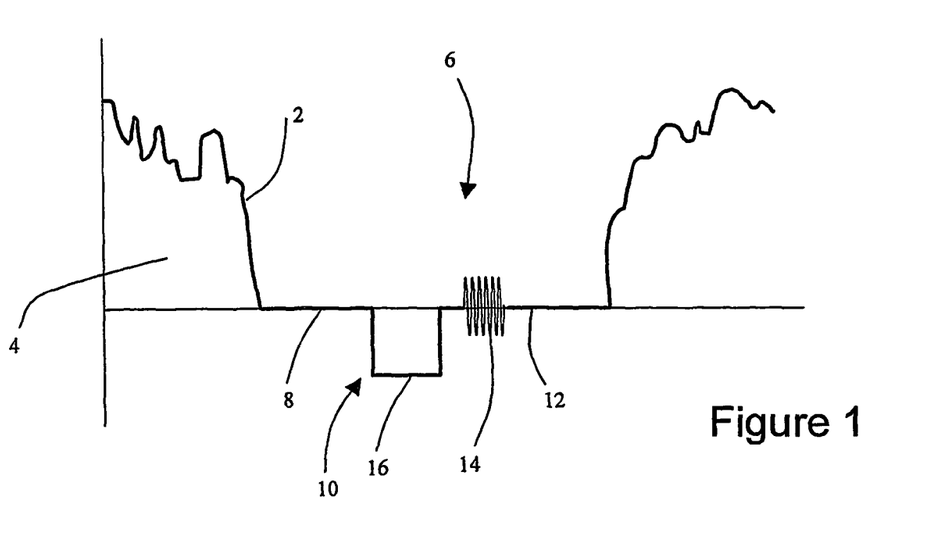
FIG. 1 illustrates the horizontal blanking interval of a conventional video signal, extending from the end of the active video on the earlier line, to the beginning of the active video on the following line.

FIG. 1, illustrates a conventional analogue video signal. The signal trace 2 starts with the end of the active video 4 preceding a horizontal blanking interval 6. The end of the active video line is followed by the front porch 8, and the horizontal sync pulse 10. Following the horizontal sync pulse, the back porch 12 is shown and, in part of the back porch, the colour burst 14. At the end of the trace, the beginning of the active video for the next line is shown. The pulse tip 16 of the horizontal sync pulse 10 descends to a level of about −300 mV. The level of the signal in the back porch is shown as about 0V. In some VTR copy protection systems, these levels may be adjusted over part of the back porch.

A modified video signal, according to a preferred embodiment of the present invention, will now be described. The modified video signal is such that the signal when viewed on a standard television or other display device shows an image of acceptable viewability, but, when applied to a video capture system either cannot be properly converted or is converted to a digital signal which cannot be played or which, when played, shows an image which is not of acceptable viewability. The modifications to the video signal in the modified video signal are referred to below as "disruption components".

The modifications or disruption components take the form of a horizontal sync pulse with altered amplitude, as well as an additional pulse added to the back porch, or to the region adjacent the back porch in the active line of the signal. The amplitude of the horizontal sync pulse may be altered, either by increasing its amplitude over at least part of the duration of the pulse, or reducing its amplitude over at least part of the duration of the pulse. The amplitude of the sync pulse in this case is understood to be the difference between 0V and, the level of the tip of the sync pulse.

In accordance with broadcast standards applicable to NTSC and PAL video signals the horizontal sync pulse typically has an amplitude of about −300 mV, relative to the black level, or black clamping level. In such a case the sync pulse amplitude of the modified video signal is arranged to be between −280 mV and −150 mV, that is from 20 mV to 150 mV higher than the normal level, and preferably between −250 mV and −200 mV.

Alternatively the sync pulse absolute amplitude may be increased. For example the amplitude may be increased to a level of −600 mV. Preferably it is increased to a level of between −320 mV and −500 mV, preferably about −350 mV and −450 mV.

In either case the increase or decrease in amplitude is for at least part of the duration of the sync pulse. Preferably it is for a duration of about 30 to 100% of the pulse in the case of an increase and 30 to 90% in the case of a decrease, for example for a duration of between 50% and 100% and 50% and 90% respectively of the pulse duration. Preferably the duration is from about 2 to 4 microseconds, preferably about 3 microseconds. The amplitude decrease or increase may occur at the beginning, in the middle, or at the end of the pulse; however, preferably in the case of a decrease in absolute amplitude it occurs after the beginning of the sync pulse and may continue to the end of the sync pulse.

Figure 2:
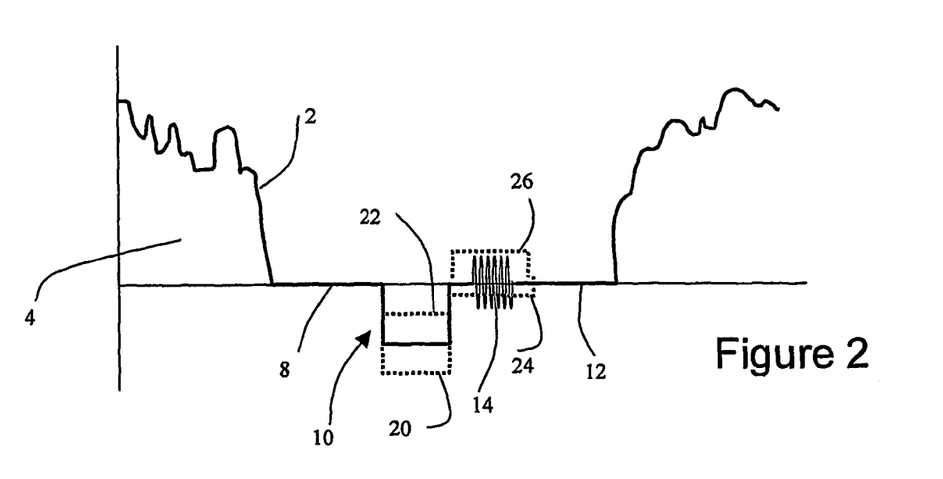
FIG. 2 shows generally and schematically a modified video signal in accordance with a preferred embodiment of the invention.

FIG. 2 schematically shows a series of modifications in accordance with the preferred embodiment of the invention. The modifications are shown by dotted outlines. A horizontal sync pulse with increased amplitude is shown as a dotted line 20. This peak of the pulse is lower than the unmodified level of the sync pulse tip 16, at a position of about −450 mV. Alternatively, a horizontal sync pulse with decreased amplitude is shown by a dotted line 22. This is higher than the unmodified sync pulse tip 16 at a level of about −200 mV. Lowering or raising the amplitude of the horizontal sync pulse in this way has been unexpectedly found to impair the operation of many analogue to digital converters to which the modified signal may be input.

The alteration in amplitude may occur on each line on which a horizontal synchronisation pulse occurs, or it may occur on only some such lines. If the altered pulses do not occur on every line, they may be clustered, for example they may occur particularly in advance of the vertical blanking interval. Further the alterations may vary from line to line or from one group of lines to another. The alterations may be absent in some fields and present in other fields. For example the increased amplitude alteration may occur on a cluster of lines, followed by the reduced amplitude alteration. There should be sufficient altered lines to ensure an appropriate level of effectiveness.

One effect of the horizontal sync pulse amplitude alterations is to change the brightness of the image on capture by the video capture system. Thus a decreased amplitude alteration results in the image being converted and/or recorded at a level brighter than the original. In extreme cases this may result in saturation of the image, with the result that areas of the image appear white. The increased amplitude alteration has the effect that the image is converted and/or recorded less brightly than the original, and may result in significant loss of visible definition in the viewed image. Switching between the increased amplitude alteration and the reduced amplitude alteration can cause an irritating change in brightness of the viewed image, on capture by the video capture system.

Additionally, the preferred embodiment of a modified video signal includes at least a part of the back porch, which is made higher or lower in comparison to the 0V level. Alternatively modification to a region of the active video line adjacent the back porch, preferably making it negative, can also be used, and this will be described later.

In accordance with the broadcast standards applicable to NTSC and PAL signals the region after the horizontal sync pulse called the back porch contains information which is designed to enable the television receiver to decipher a video signal correctly. In particular, the mean level of the back porch, or part of it, has a voltage level of 0V, and is used to determine the "black level" of the television receiver, that is the signal level which represents black on the image. The disruption component used in the back porch is therefore a positive or negative pulse, preferably having a positive or negative amplitude of between 30 and 200 mV, preferably from 50 to 150 mV.

Such a pulse may vary in duration, preferably it has a duration of about 250 ns to 4 μs, preferably 1 μs to 4 μs, for example around 3 μs. The pulse may occur immediately following the horizontal synchronisation pulse, or at a period after the horizontal synchronisation pulse, for example during the colour burst; preferably it occurs during the colour burst or about 4.8 μs after the falling (leading) edge of the horizontal sync pulse, in a PAL standard signal.

FIG. 2 therefore also shows modifications to the back porch according to the preferred embodiment. A back porch with a level lower than the conventional unmodified level is shown by the lower dotted line 24. Alternatively, a back porch with a level higher than the conventional unmodified level is shown by the lower dotted line 26.

It should be understood that the dotted lines show the signal when the relevant modification is present, and that the diagrams are intended to be schematic and not to a uniform scale. Lowering or raising the level of the back porch in this way has been unexpectedly found to impair the operation of many analogue to digital converters to which the modified signal may be input.

Figure 3:
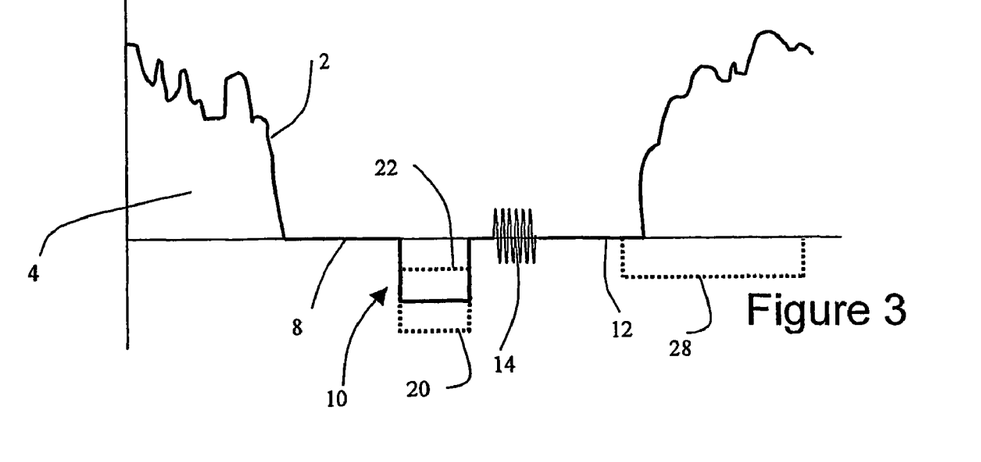
FIG. 3 shows generally and schematically a modified video signal in accordance with an alternative embodiment of the invention.

We have also found that the location of the additional pulse need not be limited to the back porch following the horizontal synchronization pulse. It may for example occur later, preferably within 10 μs to 30 μs of the falling/leading edge of the horizontal sync pulse, assuming a standard PAL signal. This would mean however that the additional pulse would occur in the active video region, and may occur partly in the back porch region as well. For this reason if the additional pulse is added to the signal outside of the back porch, it should only be done so on lines which fall in the overscan part of the picture. Otherwise, the presence of the pulse may be visible. The pulse can also be added during the vertical blanking part of the signal FIG. 3 schematically illustrates the location of this pulse 28. The pulse added to this region is a negative going pulse with an amplitude in the range −30 mv to −300 mv. This has been found to confuse the vertical synchronisation separator components in the analogue to digital converter, as it appears like a vertical synchronisation pulse. The duration of the pulse preferably varies in the range 10 μs to 58 μs, with the range 15 μs to 35 μs being most preferred.

Figure 4:
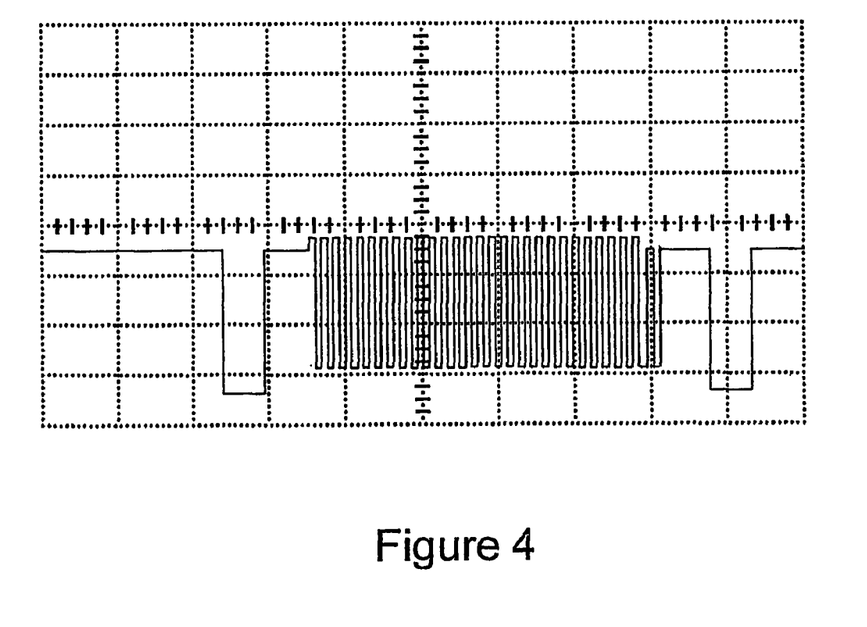
FIG. 4 shows an alternative implementation of the modification illustrated in FIG. 3.

FIG. 4 shows an alternative implementation to that described above with reference to FIG. 3. In FIG. 4, the negative going pulse is not a single square pulse but is a high frequency pulse. The amplitude of the pulse shown in FIG. 4 is about −200 mV and the frequency is approximately 4 MHz, but amplitudes in the range 0 to −300 mV, and frequencies in the range 1 MHz to 6 MHz have also been found to be possible. The scale shown on the oscilloscope trace is 0.1V per square.

Figure 5:
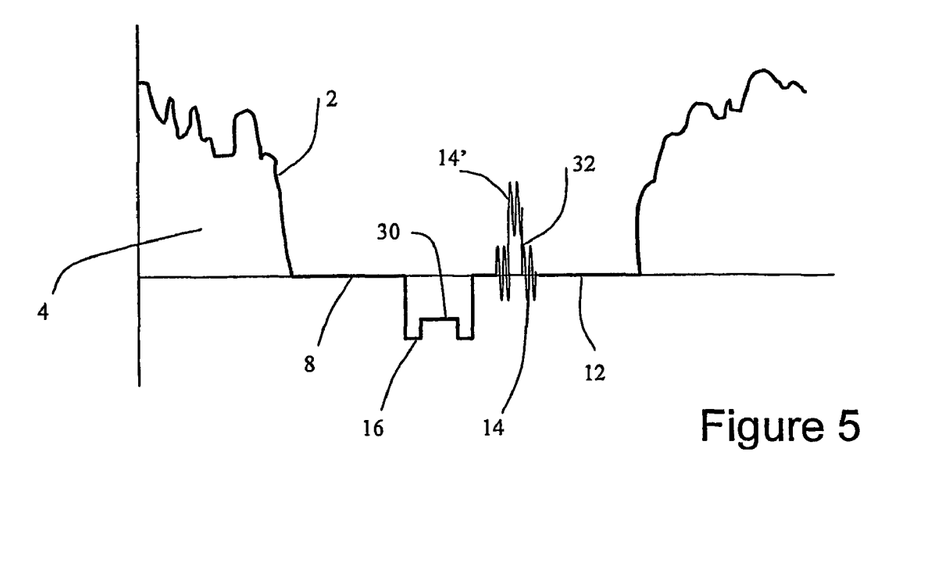
FIG. 5 shows a specific example of a modified video signal in accordance with a preferred embodiment of the invention.

FIG. 5 shows a specific example of a modified video signal according to the preferred embodiment, using the same numerals as above for FIGS. 1 and 2. In this case, a horizontal sync pulse with a decreased amplitude is produced by incorporating a disruption component pulse 30 into the bottom of the sync pulse tip 16. The pulse 30 is located more or less in the middle of the sync pulse. The amplitude of the sync pulse in the region of the disruption component pulse is about −200 mV. In experiments with a DAZZLE video capture card, for example, we have found that a level between 60 to 85 mV above the sync pulse tip 16 produces good results, as does a level of 70 to 110 mV below the sync pulse tip, in each case with a duration of about 3 µs.

FIG. 5 also shows the modification to the back porch. This is also in the form of a pulse 32 inserted shortly after the end of the horizontal sync pulse, 10. This second disruption component pulse 32 appears in the colour burst 6 and the oscillation of the colour burst on top 14' of the pulse 32 can be seen. We have found that a pulse of 70 to 120 mV or −60 to −80 mV produces effective results on the DAZZLE video capture card, for example, with an optimum pulse position of the leading edge of the pulse 4.8 µs after the leading edge of the sync pulse and duration of 3.3 µs.

Figure 6:
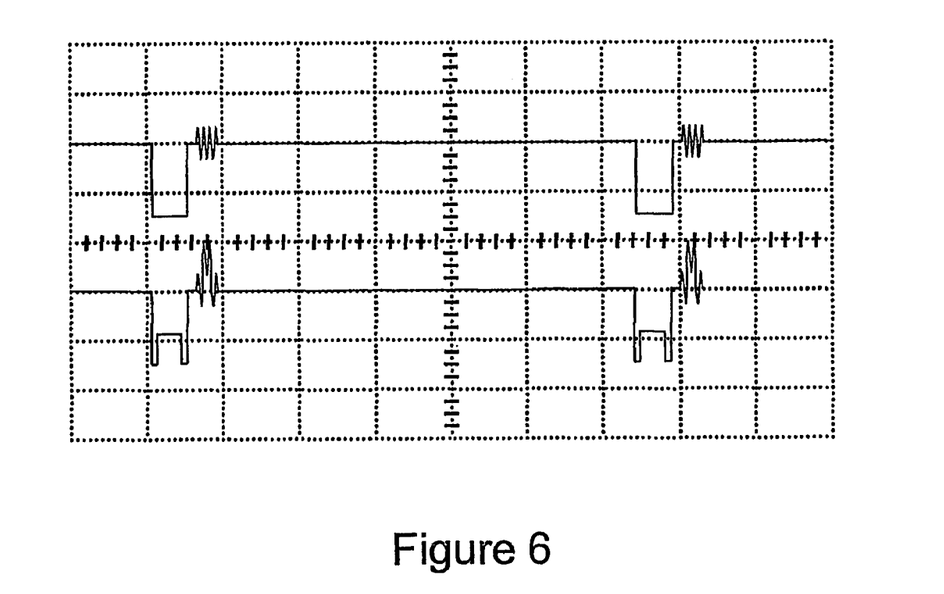
FIG. 6 shows a corresponding oscilloscope trace of the signal of FIG. 5.

FIG. 6, shows a comparison between a first oscilloscope trace showing an unmodified signal, and an oscilloscope trace for a signal modified as shown in FIG. 5. The signal shows no video picture information, for the sake of clarity.

In a trial, a PAL video signal modified according to the preferred embodiment was applied to the input of a DAZZLE DV-Bridge external video capture card, which was inserted into a PC running PowerDirector software. The modified signal is illustrated in the oscilloscope trace of in FIG. 5, in this case with a change of amplitude over the full width of the sync pulse.

Figure 7:
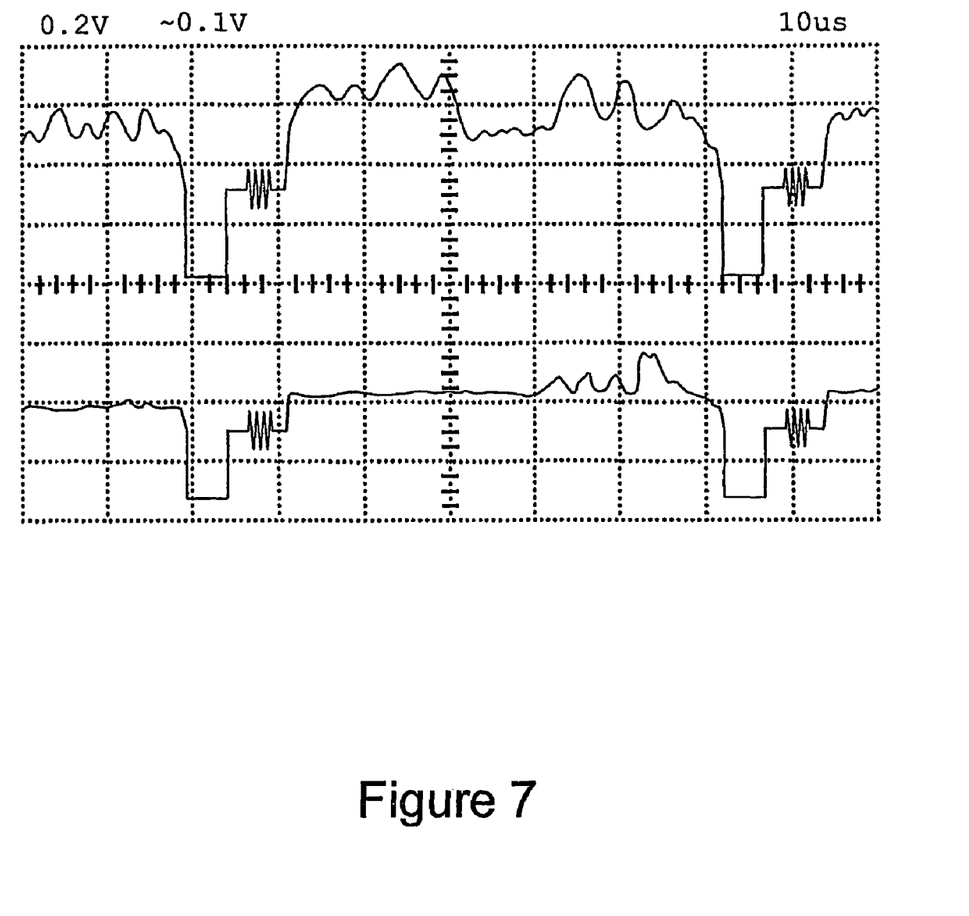
FIG. 7 shows an analogue video signal trace modified using a method and apparatus according to a preferred embodiment of the invention.

FIGS. 6 and 7 show recorded digital video signals. FIG. 6, shows playback of a recorded signal converted from an analogue video signal to which the modifications according to the invention have not been made. As shown, although the signal has been converted from the analogue to the digital domain and converted, the viewability of the image is of good quality. FIG. 7 shows illustrates the playback of a video signal with the same picture content, but which has been modified according to the preferred embodiment of the invention. As can be seen, although the signal has been converted into the digital domain, the viewability of the signal has been greatly impaired and useful or enjoyable playback of the recorded signal is now impossible.

The same tests were carried out with other systems and a "TIVO" computer based video recorder with similar results.

When the test was repeated with the DAZZLE Video Capture card using a NTSC standard signal modified in accordance with the invention, the video capture card/capture software stopped operating and no signal was recorded at all.

The modified video signal according to the preferred embodiment may be recorded on tape or other medium such as DVD or CD, including in a digital format, or may form part of a broadcast signal (which term is used to include video-on-demand), or may be introduced at the point of use by the user, for example in a system which decodes an incoming signal, for example a digital signal, and provides an analogue output for use, for example, by a standard analogue input television set. In this way, it will not be possible to copy the signal via conversion to a digital signal. One method of breaching the right owner's rights will therefore be prevented.

Figure 8:
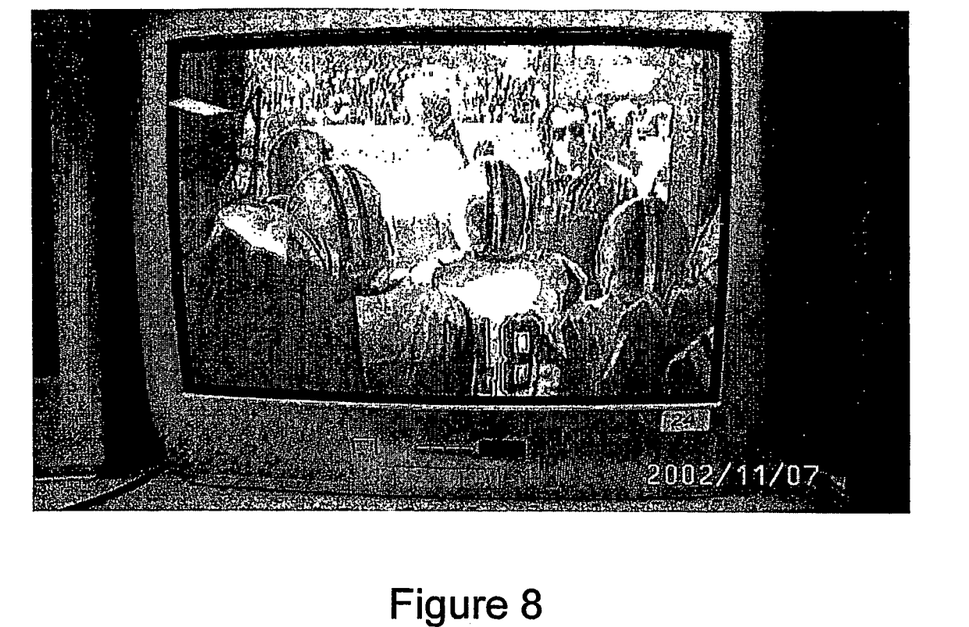
FIG. 8 shows a recorded image, which has not been modified according to the preferred embodiment of the invention.
Figure 9:
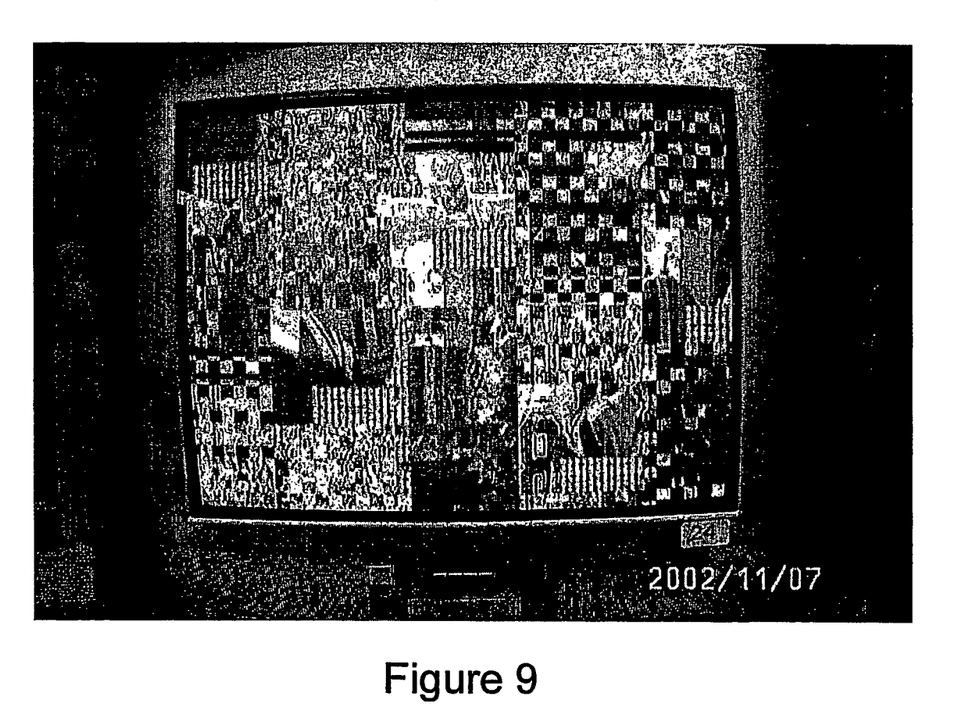
FIG. 9 shows the image when recorded after modification in accordance with a preferred embodiment of the invention.
Figure 10:
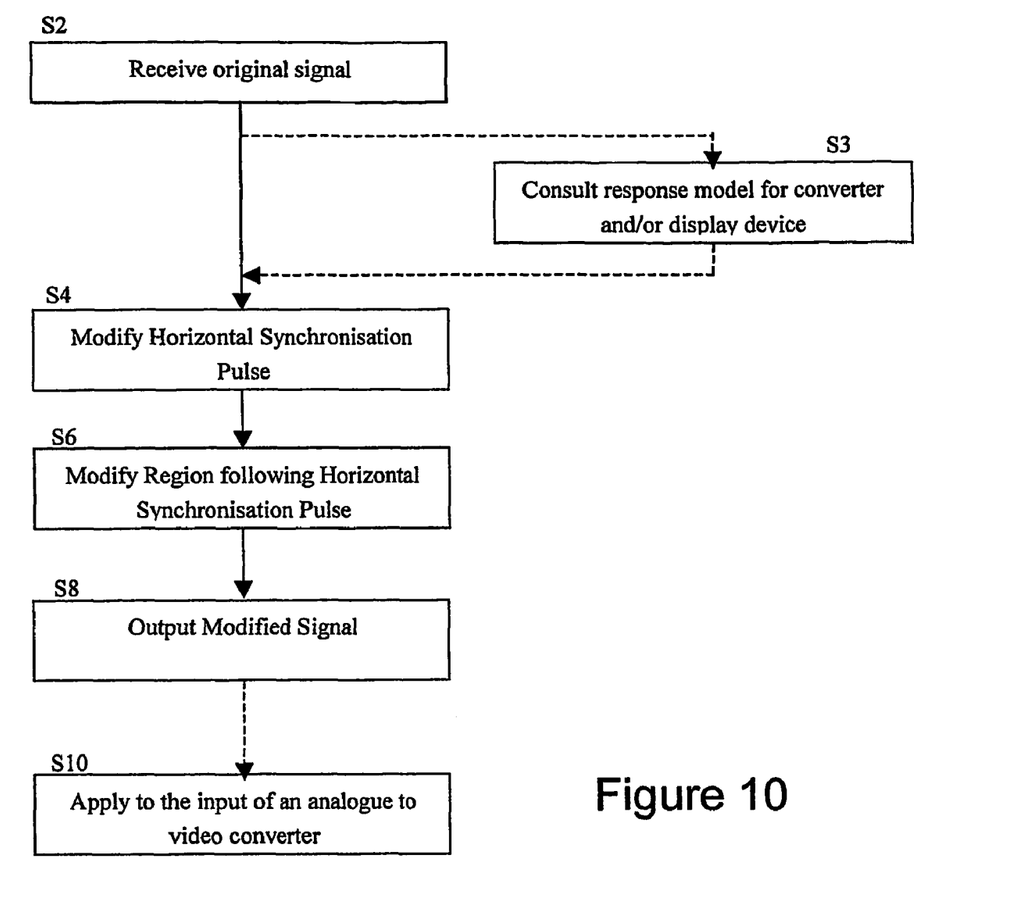
FIG. 10 schematically shows the steps comprising a method according to the preferred embodiment.

A method of disrupting the correct processing of a video signal by a video capture system will now be described in more detail, with reference to FIG. 8. An analogue video signal, which is to be modified so as to impair the operation of a video capture system is first received in step S2. The signal is then modified by altering the levels of all or part of the horizontal synchronization pulse, step S4, and/or the level of all or part of the back porch, step S6, as described above. Only one of these steps may be necessary, although both are preferred. The modified signal is then output in step S8. It may then be applied to the input of an analogue to digital converter video capture system step 10 for example. The video capture system is unlikely to be able to process the input video signal satisfactorily, and may give an output which is a degraded or scrambled signal, or may give no output at all.

As described above, modification of the original video signal into a form which impairs capture, can be performed in a number of different ways, depending on whether the amplitudes of the horizontal sync pulse, and the level of the back porch are raised or lowered, over all or part of their width, or whether one or the other is not modified. Additionally, instead of modification of the back porch, a pulse may be added after the horizontal sync pulse in a position which falls in the active line of the video signal, preferably in regions which will not be viewed on screen.

The horizontal sync pulse alteration and back porch alteration may be used together, or separately. Preferably they are used together however as the effects can be more drastic. The effects which have been observed when using both modifications include complete loss of the signal by the video capture card, so that no conversion takes place at all, either through very severe break up or pixelation of the image leading to substantial degradation of the recorded image.

Choosing which of these modifications to make, and to what extent is however dependent on the target video capture system which it is desired to impair. Video capture systems, such as video capture cards, DVD recorders and bespoke recording systems such as "TIVO" systems may for example vary in their ability to tolerate variations from the broadcast standard signal. Preferably, therefore a response model for each of the target video capture systems is maintained. In the method, the step of modifying the original video signal, then involves consulting the response model, step S3, and selecting the modifications to make in dependence on the response model and the target video capture system. The dotted lines in FIG. 8 indicate that this step is optional but preferred.

Alternatively, if the target video capture system is not known, then preferably the type of modification made to the original video signal is varied from line to line, or every pre-determined number of lines, such that the effect of the modification is experienced at least periodically in any resulting signal that is recorded. This will still impair the resulting playback sufficiently so that the resulting recorded signal is not enjoyable to view. The variation of the modifications can be based on different response models which are cycled in turn as described above.

Varying the amplitude of the modifications can additionally give improved playback on the display device as well as an increase in effectiveness of the protection. For example, if the amplitude of the modification is varied between zero, at which point the signal is identical to the original, unmodified signal, and full scale, at which the modifications are present at a maximum strength, then the display device can often compensate during the unmodified regions for any instability caused during the modified regions. Varying the amplitude of the modification to the horizontal synchronisation pulse in this way will be understood to be equivalent to varying the amplitude of the horizontal sync pulse itself.

The effect of the modifications is still experienced when analogue to digital conversion is attempted. Varying the signal between zero and full scale with a period of between 100 ms and 4 s has been found in practice to have a beneficial effect.

Also, it will be appreciated that the modified signal needs still to be viewable on a display device such as a television when it is received in its analogue un-recorded form. Also, as is well known, the ability of television sets of different manufacture to display video signals varies. Thus some television sets are able to display signals which differ from the normal broadcast signal adequately or to an acceptable level of viewability, while others are not able to do so or only display such a signal poorly. The method above may therefore preferably contain a step of consulting a display device response model to check for compatibility. This is also shown as step S3 in FIG. 8.

Apparatus for creating the modified signal in accordance with the invention can be made in accordance with well known principles by those skilled in the art. For example, in the case of a pre-existing video signal, the signal can be fed into a circuit which identifies the synchronization pulse. The circuit is commonly known as a sync separator. A separate circuit which is triggered by the timing information from the sync separator can then be used to generate the signals of each of the desired disruption components, at the correct timing for addition to the unmodified video signal, and the generated signals can be added to the unmodified signals, for example through a mixing circuit.

Means for creating a modified video signal in accordance with the invention could be implemented as hardware or as software, or as a combination of hardware and software components.

Systems for processing an analogue video signal to create a modified analogue signal at the output may be provided for example to consumers, in the form of set top boxes or the like. In such a case, the system may be adjustable so as to optimise viewability for the particular television viewing equipment used by that consumer while ensuring an optimal level of conversion impairment. To achieve this converter response model and a display device response model data are incorporated, as a look up table for example, in the device, so that the user can select at least the display device used.

The invention further provides for a system holding data comprising information about the parameter optimisation for a representative set of television viewing equipment and video capture systems, and may further provide means for remotely setting the parameters in accordance with the information in the data holding system and information provided by the user.

Such systems may further be switchable remotely, so that only certain programme material is modified by the inclusion of disruption components, while other material may be left unmodified so that the user can make acceptable copies of it.

The above description of a method and corresponding apparatus assumes that a response model for the video capture systems is known when the modifications are applied to the original video signal. If this is not the case however, or if it desired to generate such a model, then it will be necessary to investigate the effects of the modifications on different video capture systems, as well as different display devices, and make a decision as to which modifications are desirable and which are not.

Rather than cycling the types of modifications made, it may be beneficial to determine an optimised modification for the largest range of capture devices and display devices possible. The modified video signal should of course be such that it has an inhibiting effect at least on "standard" or commonly used video capture systems currently in use; and in particular those having an analogue to digital conversion system which has a sync pulse amplitude responsive gain adjustment means and/or black level adjustment means responsive to the level of the, or part of the, back porch.

In this scheme, in choosing which modifications to make the original video signal, the object is to permit viewing on a "standard" television, or as many sets of different manufacture as possible, and at the same time to impair the "pirateability" of the signal such as by the making of a digital copy using a video capture system. In doing so the user, that is the operator, of the protection system, must make a compromise which optimises the degree of digital processing disruption (for example copy protection or conversion impairment)— that is the extent of interference with copying and the number of systems on which interference occurs (referred to generally in this application as "conversion impairment"), against the requirement to ensure that the original signal remains viewable to a reasonably acceptable standard ("viewability") on as many different models of television (or other viewing means which use an analogue video input) as possible. In short the user must choose a good balance between impairing pirateability and maintaining viewability.

Accordingly, a method of choosing the parameters for such a signal will now be described. The method comprises evaluating the impact of the aforesaid disruption components in a number of video capture systems and choosing the relevant parameters to optimise the effect. To assess the effects, a panel of representative viewers or persons skilled in determining whether an image is unacceptably impaired may be used. Also, analytical computer based methods involving comparison of the content of the original modified signal and the resulting digital signal may be used.

The method preferably also comprises applying the modified video signal in analogue form to a display device, such as a television set, evaluating the impact of the disruption components on the playback of the signal on the device, and choosing parameters which permit the modified video signal to be viewed on such equipment to an acceptable level of viewability. Again, panels of representative viewers, skilled persons, or analytical computer based techniques may be used to determine what is acceptable.

Preferably, the steps of evaluating the effect of the disruption components on the analogue to digital converter and the display device are carried out simultaneously, or substantially simultaneously, so that the parameters of one or more disruption components can be adjusted, and the balance between conversion impairment and viewability, maximized.

The parameters of the disruption components which may be varied during the tests may include the duration of the signal comprising the disruption component, the magnitude of the signal and its location, as well as the rate of change of each of the foregoing parameters, for example if the magnitude of the signal is increased and decreased in a stepwise or continuous manner.

Preferably such conversion impairment parameter optimisation process is carried out in relation to a plurality of video capture systems and a plurality of television viewing equipment. In certain cases video capture systems may not be affected by the disruption components to a material degree and in such case such video capture systems may be excluded from such testing. Likewise certain television viewing equipment may not reach an acceptable standard of viewability and may for that reason be excluded from testing.

It should be understood that these modifications differ from modifications used to protect signals from copying on a standard video tape recorder. When testing the modified video signal on standard video tape recorders there was little impact on the copyability of the modified signals.

The expression 'modified video signal' in this application, is not restricted to the situation in which an unmodified signal (for example a broadcast standard signal) is input into modification circuitry in order to add the disruption components, and also includes therefore a signal which may is created ab initio. For example, the 'modified video signal' may be created by combining the picture information from one source with standard timing and control information (such as horizontal sync pulses and colour bursts) from another source, and the disruption components from a third source. In another example, the timing and disruption components may be created from one source, and added to the picture information.

Ways of making acceptable copies of a video signal containing one or more disruption components will now be considered. These can be thought of as circumvention processes, reducing the effects of the disruption components to an acceptable level or negating the effects of the disruption components altogether. Making copies includes successfully converting an analogue signal to a digital signal, even if the digital signal is not finally recorded.

Such methods may involve one or more of inserting a signal which cancels or reduces one or more of the disruption components; replacing the section of the video signal which has been modified by the inclusion of the disruption components by a section which is acceptable to the video capture system; or inserting a signal which is interpreted by video capture system in a manner which cancels the effect of the disruption component. Additionally, use of a video capture system which is insensitive to the disruption components may also circumvent the protection provided by the invention.

"Copying" a video signal modified in accordance with the present invention, may therefore be made by inputting such a signal into a video capture system which is insensitive to or is designed to be insensitive to one or more of the disruption components.

Where the circumvention process comprises the addition of a further signal which cancels the disruption components, the addition will depend on the nature of the disruption component itself. For example, if in the relevant disruption component, the amplitude of the horizontal sync pulse is increased or decreased the method may simply insert a sync pulse of the correct amplitude or sufficiently correct amplitude. Alternatively, a pulse of the opposite magnitude to the existing alteration to the sync pulse tip may be inserted, either so as to eliminate or reduce the existing alteration, or to reverse its effect. A counteracting pulse on the sync tip, such as a short duration high pulse for example, having the opposite polarity to the existing alteration to the sync tip and the opposite effect on the video capture system as the existing disruption component, may still allow the horizontal synchronization pulse to be recognised by the video capture system.

If the back porch level is altered, the method may insert a signal at about the 0 volts level. Alternatively, the method may blank the signal in the region of the back porch and insert a replacement signal conforming to the appropriate standards, or such that the signal can be converted effectively by the video capture system. If the disruption component in the active signal line is added, then a counteracting pulse may be added.

The specific examples are intended as illustrations of embodiments of the invention and are not intended to limit the scope of the invention. Those skilled in the art will understand that there are many other ways of performing the invention.

In particular, the amplitudes referred to in the description are in accordance with the positive transmission scheme employed in PAL and NTSC. It will be appreciated that the invention could also be used however with negative transmission schemes.

The invention has been found to have application in preventing the operation of a number of analogue to digital conversion devices, such as the Hollywood DV-Bridge, DVC 80, and DVC 150 made by DAZZLE Multimedia, Theatre 2000 of ATI, AVDV Video Capture Board of Pinacle Systems, AV-800 of Top Step Technology, and DVD Recorders such as the DMR-E30 of Panasonic.

The invention claimed is:

1. A method of modifying an analogue video signal to impair analogue to digital conversion of the signal, the signal comprising a plurality of horizontal synchronization pulses, each adjacent a respective back porch, the method comprising:
    receiving an original video signal for modification;
    modifying at least one of the horizontal synchronization pulses from its original form to have a greater or a smaller amplitude over at least a part of the pulse width;
    modifying the region of the signal following the horizontal synchronization pulse, either in the back porch or adjacent to it, from its original form, by inserting a first pulse into lines which appear in the overscan region of the signal, wherein the first pulse is a wave having a frequency in the range 1 MHz to 6 MHz; and
    outputting the modified video signal, wherein the modified video signal is such that the modified video signal interferes with the operation of an analogue to digital video conversion system to such an extent that, if a digital signal is output, the output digital signal has a reduced quality on playback in comparison to the original analogue video signal.

2. A method according to claim 1, comprising consulting an analogue to digital conversion device response model, and modifying the amplitude of the synchronization pulse, or modifying the region of the signal following the horizontal pulse, in dependence on the analogue to digital conversion device response model.

3. A method according to claim 1, comprising consulting a display device response model, and modifying the amplitude of the synchronization pulse, or modifying the region of the signal following the horizontal pulse, in dependence on the display device model.

4. A method according to claim 1 comprising consulting several response models and varying the modifications over time.

5. A method according to claim 1, wherein in the modifying step, the amplitude of the synchronization pulse is adjusted to be in the range −280 mV to −150 mV.

6. A method according to claim 5, wherein in the modifying step, the amplitude of the synchronization pulse is adjusted over a duration of about 30% to 100% of the pulse width.

7. A method according to claim 1, wherein in the modifying step, the amplitude of the synchronization pulse is adjusted to be in the range −250 mV to −200 mV.

8. A method according to claim 1, wherein in the modifying step, the amplitude of the synchronization pulse is adjusted to be in the range −320 mV to −600 mV.

9. A method according to claim 8, wherein in the modifying step, the amplitude of the synchronization pulse is adjusted over a duration of about 30% to 90% of the pulse width.

10. A method according to claim 8, wherein in the modifying step, the amplitude of the synchronization pulse is adjusted only after the beginning of the synchronization pulse.

11. A method according to claim 1, wherein in the modifying step, the amplitude of the synchronization pulse is adjusted to be in the range −350 mV to −450 mV.

12. A method according to claim 1,
    wherein the back porch of the signal is modified by adjusting the signal level away from the 0V level.

13. A method according to claim 12, wherein the back porch of the signal is modified by adding a pulse of positive or negative amplitude in the range 30 mV to 200 mV.

14. A method according to claim 13, wherein the amplitude of the pulse is in the range 50 to 150 mV.

15. A method according to claim 13, wherein the pulse has a duration of between 250 ns and 4 µs.

16. A method according to claim 13, wherein the pulse occurs immediately after the synchronization pulse.

17. A method according to claim 13, wherein the pulse occurs 4.8 µs after the falling edge of the synchronization pulse.

18. A method according to claim 1, wherein the region of the signal following the synchronization pulse is modified by inserting a pulse into lines which appear in the overscan region of the signal.

19. A method according to claim 18, wherein the pulse is inserted between 10 µs and 30 µs after the falling edge of the synchronization pulse.

20. A method according to claim 18, wherein the pulse has a duration of between 10 µs and 58 µs.

21. A method according to claim 18, wherein the pulse has a duration of between 15 µs and 35 µs.

22. A method according to claim 1 comprising inputting the output modified video signal into an analogue to digital converter.

23. A method according to claim 1 wherein the amplitude of the modifications are varied over time between zero, at which the modified signal is substantially identical to an unmodified signal, and full scale at which the modifications are fully present.

24. The method of claim 1, wherein the frequency of the wave is 400 MHz.

25. The method of claim 1, wherein the amplitude of the wave is in the range 0 to −300 mV.

26. The method of claim 1, wherein the amplitude of the wave is −200 mV.

27. A computer program product, comprising computer readable code embodied on a non-transitory computer readable storage medium, the computer readable code, when executed on a computer, causes the computer to perform the steps of method claim 1.

28. An apparatus arranged to modify an analogue video signal to impair analogue to digital conversion of the signal, the signal comprising a plurality of horizontal synchronization pulses, each adjacent a respective back porch, the apparatus comprising:

an input for receiving an original video signal for modification;

means for modifying at least one of the horizontal synchronization pulses from its original form to have a greater or a smaller amplitude over at least a part of the pulse width;

means for modifying the region of the signal following the horizontal synchronization pulse, either in the back porch or adjacent to it, from its original form, by inserting a first pulse into lines which appear in the overscan region of the signal, wherein the first pulse is a wave having a frequency in the range 1 MHz to 6 MHz; and an output for outputting the modified video signal, wherein the modified video signal is such that the modified video signal interferes with the operation of an analogue to digital video conversion system to such an extent that, if a digital signal is output, the output digital signal has a reduced quality on playback in comparison to the original analogue video signal.

29. An apparatus in accordance with claim 28, in which the characteristics of the modifications can be set remotely.

30. A method of modifying a signal, generated by the method of claim 1, such that analogue to digital conversion can take place, the method comprising;

receiving a video signal; determining which of the amplitude of the synchronization pulse, and the region following the synchronization pulse have been modified; and modifying the amplitude of the synchronization pulse, and/or modifying the region following the synchronization pulse, in dependence on the determining step, to allow analogue to digital conversion.

31. A method according to claim 30, comprising recording the modified signal onto a storage medium.

32. An apparatus arranged to modify a signal, generated by the method of claim 1, such that analogue to digital conversion can take place, the apparatus comprising;

an input for receiving a video signal; an analyzer for determining which of the amplitude of the synchronization pulse, and the region following the synchronization pulse have been modified; and means for modifying the amplitude of the synchronization pulse, and/or modifying the region following the synchronization pulse, in dependence on the determination of the analyzer, to allow analogue to digital conversion.

* * * * *